July 22, 1958 C. W. MANGER ET AL 2,844,581
ORGANIC PIGMENTS
Filed Nov. 22, 1957
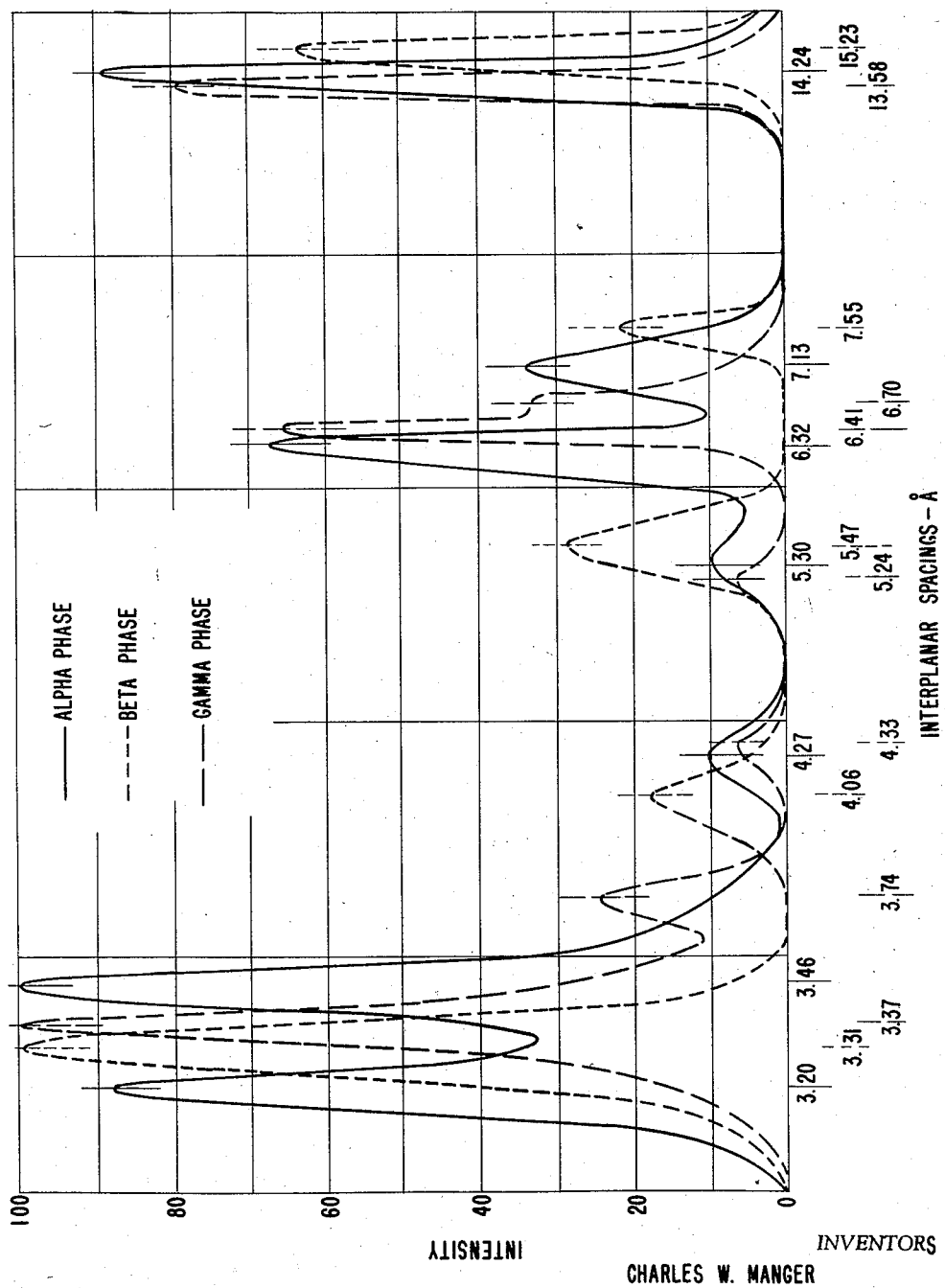
INVENTORS
CHARLES W. MANGER
WILLIAM S. STRUVE
BY Francis J. Crowley
ATTORNEY

United States Patent Office 2,844,581
Patented July 22, 1958

2,844,581

ORGANIC PIGMENTS

Charles W. Manger, Irvington, and William S. Struve, Chatham, N. J., assignors to E. I. du Pont de Nemours and Company, Wilmington, Del., a corporation of Delaware Application November 22, 1957, Serial No. 698,151

7 Claims. (Cl. 260—279)

This invention pertains to quinacridone pigments.

While red pigments have been known and used for many years, there has existed a long-felt need in the coating composition field for a non-bleeding red color which possesses satisfactory tinctorial strength and light-fastness as well as superior outdoor durability with respect to gloss, film integrity and bronzing. Moreover, this need has become more acute in recent years as a result of the wide acceptance of red color shades, particularly in automotive finishes.

It has now been found that linear quinacridone which is represented by the following structural formula

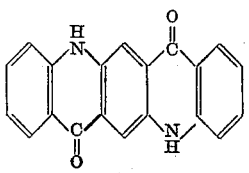

may be produced as pigments in a number of crystal phases with each phase exhibiting a different and heretofore unknown X-ray diffraction pattern. The present invention is concerned with the gamma crystal phase as distinguished from the alpha and beta crystal phases which are the respective subject matter of applications Serial Nos. 523,699 and 523,754, concurrently filed July 22, 1955. Methods of producing quinacridone are disclosed in Serial No. 523,922, filed July 22, 1955.

It is an object of this invention to provide a novel gamma crystal phase quinacridone pigment of intense red color and good tinctorial strength. It is also an object of this invention to produce color lakes from this pigment. It is a further object of this invention to provide novel processes for producing gamma crystal phase quinacridone pigments.

The objects of this invention may be accomplished by a three-step process: the first step comprises salt milling quinacridone in any crystal phase or any mixture of crystal phases; the second step is wetting the salt-pigment mixture with dimethyl formamide; and the third step is the extraction of the salt and the dimethyl formamide with a dilute aqueous acid solution. This process gives an intense red in the gamma crystal phase. The first step, i. e., the salt milling, is carried out until a suitable small particle size has been achieved. The wetting of the pigment-salt mixture may take place during the milling operation, or it may take place thereafter before the aqueous medium is used to separate the salt from the quinacridone.

The objects of this invention may also be accomplished by wetting an alpha crystal phase quinacridone with dimethyl formamide whereupon large crystals of the gamma crystal phase will grow. If a smaller particle size is desired, these crystals may be milled in the presence of salt and dimethyl formamide or in a saturated aqueous salt solution.

For many pigmentary uses and particularly for the attainment of the maximum tinctorial strength, it is generally considered necessary to reduce the particle size of pigments such as the quinacridone pigments to such an extent that the products exhibit surface areas above about 60 square meters per gram (as measured by the nitrogen absorption method of Emmett described in "Advances in Colloid Science," vol. 1, 1942. The particle sizes mentioned in this specification are based upon this method). However, it is also recognized that maximum particle size reduction frequently results in a maximum depth of masstone and in transparency of the masstone color in many uses. On the other hand, there are many uses of pigments in which the depth of masstone and transparency obtainable by this maximum particle size reduction are not desirable. For instance, in the preparation of brilliant red automotive enamels, relatively light, opaque colors are desirable and it is now found that the gamma crystal phase quinacridone in a particle size range of 25—30 square meters per gram is ideally adapted for such uses. Consequently, the usual critical limitation on particle size does not apply to gamma crystal phase quinacridone and it is a highly useful pigment both in the small particle size for deep masstones and maximum tinting strength and in the markedly larger particle sizes for the brilliant red colors of considerable opacity.

The accompanying drawing shows the X-ray diffraction patterns of the alpha, beta and gamma crystal phases of quinacridone with the intensities adjusted so that the most intense band of each pattern is assigned a value of 100 and the patterns are then superimposed in one drawing. These X-ray patterns were obtained by the well-known powder technique using a Geiger counter to record the intensity of the diffracted rays. The instrument actually records the intensity of the diffracted ray on the vertical axis versus the angle of diffraction on the horizontal axis with CuK alpha radiation, and then this angle is converted to interplanar spacings expressed in Angstrom units. The values given are accurate to within 2% and in most cases, variation is less than 1%. Therefore, cognizance should be taken of this variance when interpreting the specification and the claims. It is obvious that these patterns have certain similarities and this is natural because of the chemical identity of the phases. Nevertheless, there are characteristic differences.

The alpha phase in small particle size is characterized by two intense lines quite close together with interplanar spacings of 3.46 A. and 3.19 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. In hue, this product is a bluish red pigment of excellent strength and intensity. This phase is the easiest of the three phases to obtain.

The beta phase is characterized by five well-defined lines corresponding to interplanar spacings of 15.23 A., 7.55 A., 5.47 A., 4.06 A. and 3.31 A. The lines with interplanar spacings of 15.23 A. and 3.31 A. are characteristically much stronger than the other three. This product is a violet pigment of excellent intensity and strength, exhibiting a high degree of resistance to change under various conditions. It is a valuable pigment in its own right and also as a blending agent for use with blue pigments to obtain reddish blues.

The gamma phase is characterized by three strong lines with interplanar spacings of 13.58 A., 6.41 A. and 3.37 A. and four relatively weaker lines having interplanar spacings of 6.70 A., 5.24 A., 4.33 A. and 3.74 A. The line with the interplanar spacing of 6.70 A. characteristically appears, in the small particle size pigmentary products, as a hump on the side of the characteristically stronger line with the interplanar spacing of 6.41 A. However, in the larger particle size, and generally more crystalline products, this line may appear as a separate peak which approaches the intensity of the 6.41 A. line. In fact, the association of these two lines is one of the most characteristic factors in the X-ray patterns of the gamma crystal phase quinacridone. This product is a bluish red pigment of good tinctorial strength and excellent intensity of color and it exhibits outstanding resistance to change either on exposure to the elements, to solvents, or to chemical reagents. It is stable to heat up to about 400° C. and to the influence of many organic solvents which have been found to cause crystal growth accompanied by phase changes with other forms of quinacridone pigments.

The following examples are illustrative of the invention, but not in limitation thereof:

*Example 1*

6,13 dihydro quinacridone is prepared by heating diethyl-2,5-dianilino-3,6-dihydro-terephthalate in an atmosphere of nitrogen at 250–257° C. for one hour in 4 times its weight of a mixture comprising 23.5% biphenyl and 76.5% diphenyl oxide. The dihydro quinacridone obtained is separated by filtering and then washed with ethyl alcohol. 10 parts of the 6,13 dihydro quinacridone and 25 parts of water are then charged to a suitable vessel equipped with an agitator and a reflux condenser. 200 parts of ethyl alcohol is then added, followed in turn by 4 parts of sodium hydroxide (as a 20% solution) and 20 parts of nitrobenzene-m-sodium sulfonate. The mixture is heated to reflux while stirring and maintained at reflux temperature for about 2 hours. After cooling the product is filtered off, washed free of alkali and dried to give 9.6 parts of quinacridone.

A ball mill of about 60 gallons total volume is charged with 1000 lbs. of "Cyl Pebs" (cylindrical bars of iron about ½" in diameter and 1" long) together with about 100 lbs. of common nails (20d size). 52 lbs. of dry sodium chloride is then added, followed by 6.0 lbs. of the crude quinacridone. The mill is tightly closed and rotated at about 70% of the critical speed for about 15 hours. The dry powder is then discharged from the mill and added to about 40 lbs. of dimethyl formamide, and the mixture is stirred until the dry powder is thoroughly wet. 400 lbs. of a dilute acid solution containing about 20 lbs. of sulfuric acid (100%) is then added, and the slurry is heated to the boil and boiled for about 30 minutes. The pigment is then isolated by filtering, washing free of soluble salts, and drying. When examined by X-ray diffraction the resulting product exhibits the diffraction pattern characteristic of the gamma phase, showing three strong lines corresponding to interplanar spacings of 13.58 A., 6.41 A. and 3.37 A. and three relatively weak lines corresponding to interplanar spacings of 5.24 A., 4.33 A. and 3.74 A. The product is a bluish red pigment with a surface area greater than 60 square meters per gram and possessing excellent strength and intensity. Coating compositions made therefrom exhibit outstanding resistance to change either on exposure to the elements, to solvents, or to chemical reagents. Thus, printing inks containing highly extended tints of this pigment have shown no significant change in color after 400 hours in the fadeometer. Panels coated with alkyd enamel compositions pigmented with gamma phase quinacridone have been exposed to the elements in Florida for 12 months, and the results show no significant change in color, excellent gloss retention, and no loss in film integrity.

*Example 2*

100 parts of crude quinacridone prepared as shown in Example 1 are mixed with about 400 parts of dimethyl formamide to give a fluid slurry which is allowed to stand for about 24 hours. The pigment is isolated from the dimethyl formamide by filtration, slurrying the filter cake in water, filtering again and washing with water, followed by drying in a conventional manner. The resulting product is found to be a crystalline material having a particle size on the order of 10–20 square meters per gram, and it exhibits an X-ray diffraction pattern characterized by three strong lines with interplanar spacings of 13.58 A., 6.41 A. and 3.37 A. and four relatively weaker lines having interplanar spacings of 6.70 A., 5.24 A., 4.33 A. and 3.74 A. This material can be used as a pigment without particle size reduction, but for most commercial uses the particle size should be smaller.

A ball mill of about 60 gallons total volume is charged with "Cyl Pebs" and nails as in Example 1. It is then charged with 52 lbs. of dry sodium chloride, 6.0 lbs. of the crude gamma phase quinacridone obtained above and .36 lb. of dimethyl formamide, and the mixture is milled as in Example 1 for about 15 hours to reduce the particle size in terms of surface area to greater than 60 square meters per gram. The powder is then discharged from the mill and slurried in about 600 parts of 5% sulfuric acid, heated to the boil, boiled for about 1 hour, filtered, washed free of soluble salts and dried to give an intense red pigment substantially identical to the product of Example 1.

If a brilliant red suitable for use in masstone in automotive finishes is desired, the grinding time can be reduced to about 1–2 hours, and a pigment with a particle size of about 25–30 square meters per gram is obtained.

*Example 3.—Rosinated lake of gamma phase quinacridone*

Gamma phase quinacridone is made as in Examples 1 and 2, but it is retained in paste form instead of drying. 2600 parts of such a paste (equivalent to 500 parts of dry gamma phase quinacridone) is slurried with water to make a total volume equivalent to about 3000 parts, and the temperature is adjusted to about 50° C. In a separate container, 200 parts of hydrogenated rosin is dissolved in a solution of 27 parts of sodium hydroxide in 1500 parts of water at the boil, and this solution is added to the quinacridone suspension and stirred well. A solution of 65 parts calcium chloride in 1000 parts of water is then added slowly, and the slurry is stirred for about 30 min. while keeping the temperature at about 50–60° C. The resulting pigment is isolated by filtering, washing free of soluble salts and drying to give about 710 parts of a brilliant red powder containing about 70% of gamma phase quinacridone and 30% of the calcium salt of hydrogenated rosin. The quinacridone in this form is very easy to disperse in coating and printing vehicles.

The lakes may contain 50 to 80% color by weight and a preferred amount is 70%. Such rosinated lakes may be made from various grades of rosin dissolved in any convenient alkali and precipitated with an alkaline earth or a heavy metal salt. Barium, calcium, magnesium, aluminum and zinc salts are suitable for forming the insoluble rosinate. Hydrogenated rosin is especially suitable for forming the lakes because of its relative purity and light color; furthermore, it is a saturated molecule, and there is no problem of spontaneous oxidation and consequent fire hazard. With hydrogenated rosin, calcium is the preferred precipitant because it gives a solid precipitate in contrast to some metals which give soft oily precipitates. The particular salt of calcium used is dicated by economy and availability. Thus calcium nitrate or calcium acetate would be equally effective.

The salt milling processes of this invention are essentially alike in operation procedure, and said procedures are conventional. Any mill which grinds by shearing and attrition is suitable; e. g., a roller mill, an edge-runner mill or a ball mill which is the preferred apparatus. The use of "Cyl Pebs" and nails as the grinding medium in the ball-milling operation of the examples is a matter of convenience which minimizes the tendency of such dry charges to pack in a ball mill. The ratio of salt to pigment is usually at least 4:1 and preferably close to 9:1. However, it may vary considerably on either side of the preferred ratio with only minor influence. The nature of the salt may also vary, but there are few substances which can approach the availability and low cost of sodium chloride. Examples of other salts include potassium chloride, anhydrous sodium sulfate and calcium carbonate. Water soluble salts are preferred because they are more easily separated. Powdered commercial grades of these enumerated materials are convenient to use. The time of milling will vary with the size of the mill, and the optimum time for any given mill is easily determined by one skilled in the art. In one respect, however, the conditions of salt milling are critical in the control of the crystal phase of the resulting small particle size quinacridone. This critical point is the presence, or absence, of certain liquids either during or immediately after the milling step. Thus, in the above-mentioned application, Serial No. 523,699, it is pointed out that milling with salt in the absence of any such liquid, followed by extraction with water, results in the formation of the alpha phase regardless of the crystal phase of the starting material. On the other hand, it is pointed out in Serial No. 523,754, which is also referred to above, that milling with salt in the presence of a non-polar liquid, such as xylene, results in the beta phase regardless of the phase of the crude quinacridone. Now it has been found that milling in the presence of dimethyl formamide prevents any change from gamma phase to the alpha phase if the crude quinacridone being milled is in the gamma phase to start. Finally, and even more surprising, it has been found that salt milling and contacting the salt pigment mixture with dimethyl formamide results in the gamma crystal phase quinacridone. This contact may take place during the milling operation or immediately thereafter, provided it is done before the water extraction step.

The amount of dimethyl formamide required in the first instance to insure retaining the gamma phase during the grinding step is in the range of about 6% to about 100% by weight based on the pigment ground, preferably about 6-10%. The upper limit is set by the requirement that the mixture shall behave in the mill as a dry powder free from any appearance of wetness.

The amount of dimethyl formamide in the second instance to convert the pigment to the gamma phase is that amount required to completely wet up the mixture. For convenience in stirring, an amount sufficient to give a fluid slurry may be used, but with the use of suitable mixing equipment, as for instance a dough mixer, a substantially smaller amount may be used. The amount is not critical as long as the powder is thoroughly wet.

Another effective method of particle size reduction involves grinding in a saturated water solution of a soluble inorganic salt such as sodium chloride or borax in the presence of a substantial excess of undissolved salt. This method is especially useful where the actual grinding is done by subjecting the mixture to high energy shear and impact treatment imparted thereto by a surface moving at a high rate of speed with respect to the body of the mixture. This method does not result in any phase change, and, when used with a crude quinacridone in gamma crystal phase, it yields a small particle size gamma phase quinacridone of excellent properties.

The extraction to remove salt is a conventional operation in salt milling, and the pigment may be retained in paste form for use in aqueous systems or it may be dried in any convenient manner and pulverized to a powder form. The alternative conversion to a rosinated lake is a convenient method for making the pigment easily dispersible in coating composition vehicles.

The brilliant red gamma phase quinacridone is a very durable and very stable pigment which is non-bleeding and stable to chemical agents. The gamma phase is similar in hue to the alpha phase, but is more stable to the action of organic solvents. The pigment of this invention is useful in all the fields in which colored pigments are needed. It has special value in those compositions which may be exposed to the elements, particularly light, or to chemical agents and solvents. Thus, it is a valuable pigment for use in automotive finishes and for inks to be used on outdoor posters. It is useful in coloring linoleum, vinyl plastics, rubber and the like.

This application is a continuation-in-part of our co-pending application Serial No. 523,755, now abandoned, filed July 22, 1955.

We claim:

1. As a new red pigment, linear quinacridone in gamma crystal phase, characterized by an X-ray diffraction pattern exhibiting three strong lines corresponding to interplanar spacings of 13.58 A., 6.41 A. and 3.37 A., and four relatively weak lines corresponding to interplanar spacings of 6.70 A., 5.24 A., 4.33 A. and 3.74A.

2. A new red pigment comprising linear quinacridone in the gamma crystal phase characterized by an X-ray diffraction pattern exhibiting three strong lines corresponding to interplanar spacings of 13.58 A., 6.41 A. and 3.37 A. and three relatively weak lines corresponding to interplanar spacings of 5.24 A., 4.33 A. and 3.74 A., said gamma crystal phase quinacridone having a surface area of at least 60 square meters per gram.

3. A process for preparing a gamma crystal phase linear quinacridone pigment characterized by an X-ray diffraction pattern exhibiting three strong lines corresponding to interplanar spacings of 13.58 A., 6.41 A. and 3.37 A., and three relatively weak lines corresponding to interplanar spacings of 5.24 A., 4.33 A. and 3.74 A., which comprises salt milling linear quinacridone and contacting the milled mixture with dimethyl formamide to insure the gamma crystal phase, said salt milling being continued until the surface area of the pigment is at least 60 square meters per gram, separating the salt and the dimethyl formamide and recovering a gamma crystal phase quinacridone pigment.

4. A process for preparing a gamma crystal phase linear quinacridone pigment characterized by an X-ray diffraction pattern exhibiting three strong lines corresponding to interplanar spacings of 13.58 A., 6.41 A. and 3.37 A., and three relatively weak lines corresponding to interplanar spacings of 5.24 A., 4.33 A. and 3.74 A., which comprises salt milling linear quinacridone until the surface area of the quinacridone is at least 60 square meters per gram, thereafter wetting the milled mixture with dimethyl formamide to produce the gamma crystal phase, separating the salt and the dimethyl formamide, and recovering a gamma crystal phase quinacridone pigment.

5. A process for preparing a gamma crystal phase linear quinacridone pigment characterized by an X-ray diffraction pattern exhibiting three strong lines corresponding to interplanar spacings of 13.58 A., 6.41 A. and 3.37 A., and three relatively weak lines corresponding to interplanar spacings of 5.24 A., 4.33 A. and 3.74 A., which comprises salt milling a mixture of salt and linear quinacridone wetted with dimethyl formamide to produce the gamma crystal phase, said milling being continued until the surface area of the pigment is at least 60 square meters per gram, separating the salt and the dimethyl formamide and recovering a gamma crystal phase quinacridone pigment.

6. A process for preparing a gamma crystal phase linear quinacridone pigment characterized by an X-ray diffraction pattern exhibiting three strong lines corresponding to interplanar spacings of 13.58 A., 6.41 A. and 3.37 A., and three relatively weak lines corresponding to interplanar spacings of 5.24 A., 4.33 A. and 3.74 A., which comprises salt milling gamma crystal phase linear quinacridone until the surface area of said quinacridone is at least 60 square meters per gram, said milling being conducted in the presence of dimethyl formamide to maintain the gamma crystal phase, said dimethyl formamide being present in an amount ranging from 5% by weight of the quinacridone to an amount at which the grinding mass begins to coalesce, separating the salt and the dimethyl formamide, and recovering a gamma crystal phase linear quinacridone pigment.

7. The process of claim 6 in which the dimethyl formamide is present in an amount ranging from 6–10%.

References Cited in the file of this patent

UNITED STATES PATENTS

| | | |
|---|---|---|
| 2,013,090 | Erskine et al. | Sept. 3, 1935 |
| 2,054,100 | Scott et al. | Sept. 15, 1936 |
| 2,378,283 | Bucher | June 12, 1945 |
| 2,402,167 | Lang | June 18, 1946 |
| 2,453,490 | Calloway et al. | Nov. 9, 1948 |
| 2,601,668 | Tullsen | June 24, 1952 |
| 2,687,410 | Hanke | Aug. 14, 1954 |

OTHER REFERENCES

Liebermann et al.: "Annalen," vol. 158 (1935), pages 245 thru 259.